US008587402B2

(12) United States Patent
O'Shaughnessy et al.

(10) Patent No.: US 8,587,402 B2
(45) Date of Patent: Nov. 19, 2013

(54) CONTEXT AWARE DATA PROCESSING IN MOBILE COMPUTING DEVICE

(75) Inventors: Kevin Michael O'Shaughnessy, Galway (IE); Ivo Ruben Willem Jager, Amstelveen (NL)

(73) Assignee: Palm, Inc., Sunnyvale, CA (US)

( * ) Notice: Subject to any disclaimer, the term of this patent is extended or adjusted under 35 U.S.C. 154(b) by 1393 days.

(21) Appl. No.: 12/044,905

(22) Filed: Mar. 7, 2008

(65) Prior Publication Data
US 2009/0224867 A1 Sep. 10, 2009

(51) Int. Cl.
G05B 19/00 (2006.01)

(52) U.S. Cl.
USPC .... 340/5.1; 340/286.02; 340/505; 340/573.1; 455/456.1; 455/456.3; 455/456.6; 700/21; 700/79; 700/82; 706/9; 706/12

(58) Field of Classification Search
USPC ........ 340/5.1, 286.02, 505, 573.1; 455/456.1, 455/456.3, 456.6; 700/21, 82, 79; 706/9, 12
See application file for complete search history.

(56) References Cited

U.S. PATENT DOCUMENTS

| 6,889,900 | B2* | 5/2005 | Davies et al. ................. 235/385 |
| 7,076,255 | B2 | 7/2006 | Parupudi et al. |
| 7,847,699 | B2* | 12/2010 | Lee et al. ..................... 340/573.1 |
| 2002/0083025 | A1* | 6/2002 | Robarts et al. .................. 706/12 |
| 2003/0182394 | A1* | 9/2003 | Ryngler et al. ............... 709/217 |
| 2004/0117157 | A1* | 6/2004 | Bantz et al. ................... 702/188 |
| 2004/0225654 | A1* | 11/2004 | Banavar et al. .................. 707/6 |
| 2005/0003804 | A1 | 1/2005 | Huomo et al. |
| 2005/0020277 | A1* | 1/2005 | Krumm et al. ............. 455/456.1 |
| 2005/0070304 | A1* | 3/2005 | Farchmin et al. .......... 455/456.1 |
| 2005/0086264 | A1* | 4/2005 | Masuda ...................... 707/104.1 |
| 2005/0144343 | A1* | 6/2005 | Hamdan ........................ 710/57 |
| 2006/0020633 | A1* | 1/2006 | Cho .......................... 707/104.1 |
| 2006/0025871 | A1* | 2/2006 | Khalil et al. .................... 700/21 |
| 2007/0038438 | A1* | 2/2007 | Cho et al. ........................ 704/9 |
| 2007/0150186 | A1* | 6/2007 | Ingulsrud ...................... 701/211 |
| 2007/0239630 | A1* | 10/2007 | Davis et al. ..................... 706/12 |
| 2007/0248093 | A1* | 10/2007 | Yamamura et al. ........... 370/392 |
| 2008/0077661 | A1* | 3/2008 | Jeon et al. ...................... 709/203 |
| 2008/0248789 | A1* | 10/2008 | Song et al. ................. 455/414.3 |
| 2009/0261978 | A1* | 10/2009 | Lee et al. ................... 340/573.1 |

FOREIGN PATENT DOCUMENTS

| KR | 10-2007-0056673 A | 6/2007 | |
| KR | 10-2007-0058857 A | 6/2007 | |
| WO | WO 2007/066887 A1 | 6/2007 | |
| WO | WO 2008026804 A1 * | 3/2008 | ............. H04L 29/08 |

OTHER PUBLICATIONS

Radi, H. "Adding Smartness to Mobile Devices—Recognizing Context by Learning from User Habits," Johannes Kepler Universität Linz, Dissertation, Jan. 13, 2006, 157 pages.

(Continued)

Primary Examiner — George Bugg
Assistant Examiner — Paul Obiniyi

(57) ABSTRACT

A data processing apparatus comprising a sensor and a context engine module. The sensor is configured to generate a sensor output signal representative of a value for one or more context aspects of the data processing apparatus and a confidence factor associated with each of the values for the one or more context aspects. The context engine module is configured to process the sensor output signal to generate and make available a final value for one or more context aspects of the data processing apparatus.

13 Claims, 9 Drawing Sheets

(56) References Cited

OTHER PUBLICATIONS

PCT International Search Report and Written Opinion, PCT Application No. PCT/US2009/035618, Oct. 20, 2009, 9 pages.

PCT International Search Report and Written Opinion, PCT Application No. PCT/US2008/077266, Mar. 31, 2009, 8 pages.
Supplementary European Searach Report: EP 09718635.7 2411 / 2258141; Jan. 27, 2012.

* cited by examiner

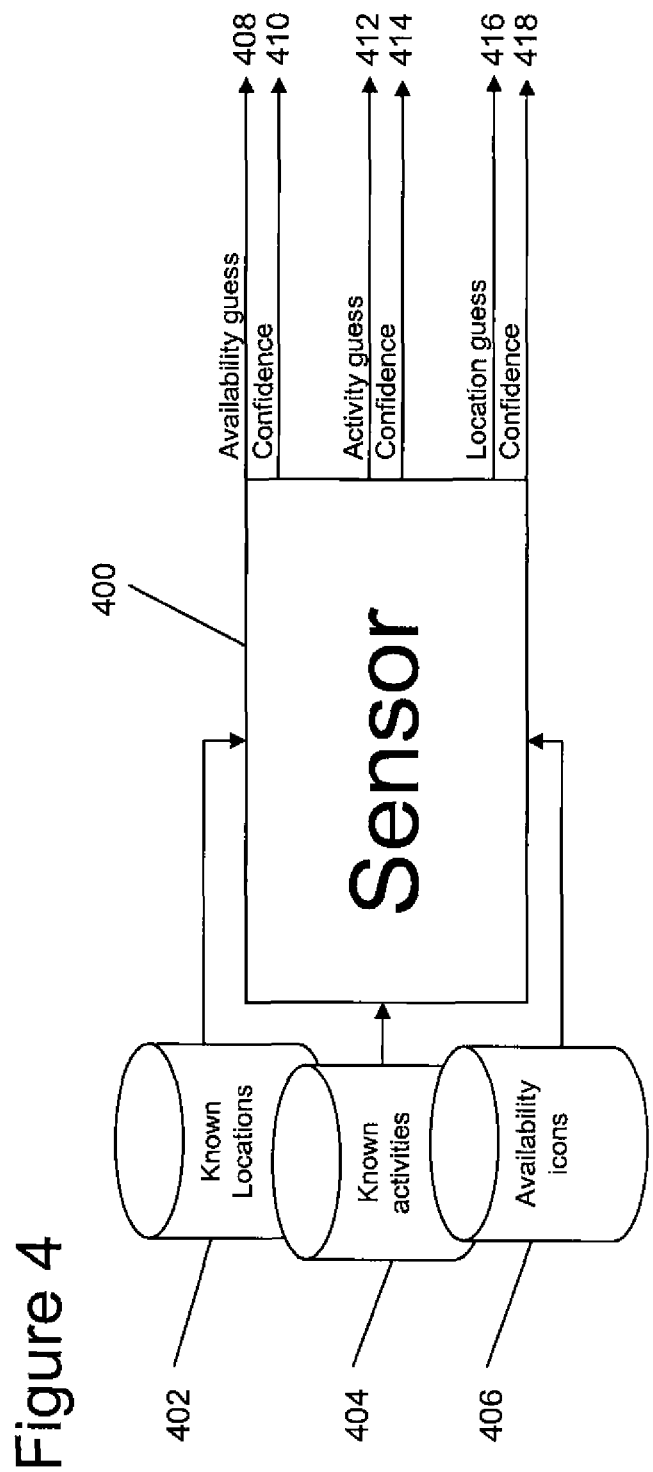

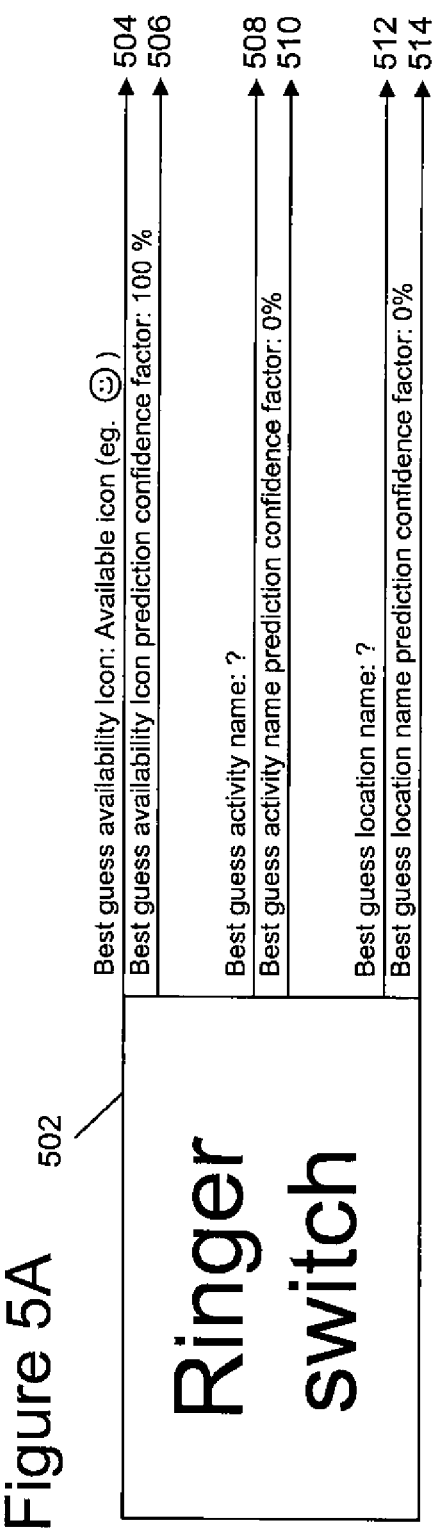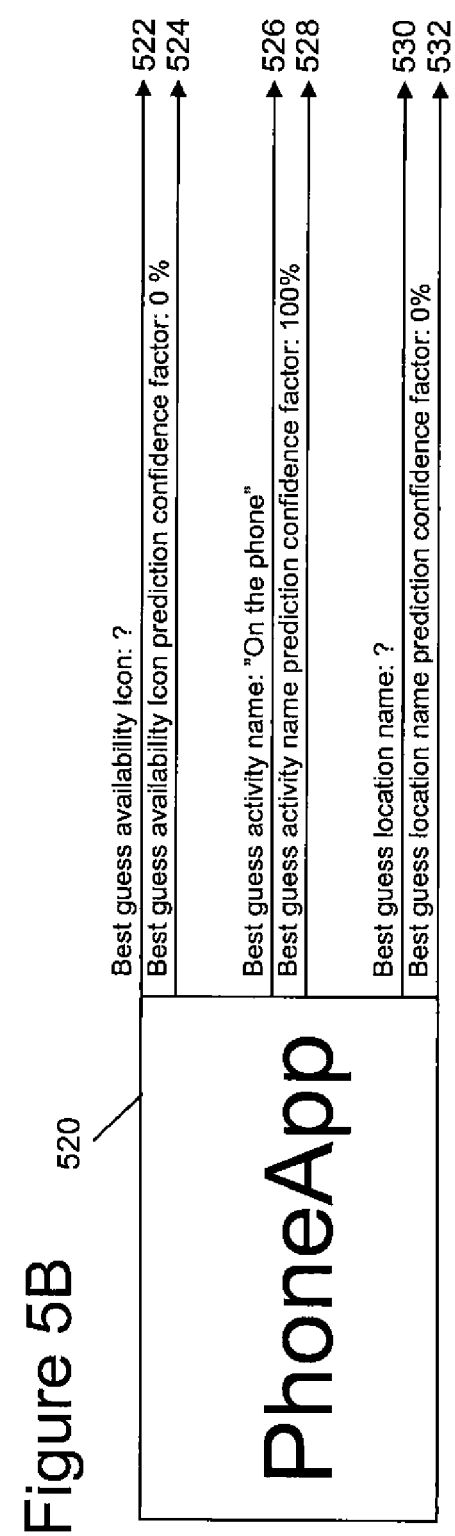

CONTEXT AWARE DATA PROCESSING IN MOBILE COMPUTING DEVICE

CROSS REFERENCE TO RELATED APPLICATIONS

This disclosure is related to U.S. Pat. No. 7,917,456 entitled "Profile Configuration for a Data Processing Apparatus," filed on Oct. 8, 2007, which is incorporated by reference herein in its entirety.

BACKGROUND

1. Field of Art

The present disclosure relates to data processing apparatus and a method of operating data processing apparatus for making available a context aspect of the data processing apparatus, more specifically to mobile communications devices that comprise a context engine to process context aspect values received from a plurality of sensors and makes available a final value for the context aspect of the device.

2. Description of the Related Art

Users of communications devices such as cellular telephones, smartphones, personal digital assistants (PDAs) and data processing apparatus are often carried by the users of such devices. While it is convenient to have a communications device available to the user at all times, the communication devices may become intrusive. For example, the communication devices may be intrusive if telephone calls are received whilst in a meeting or business telephone calls received whilst at home. A user may wish to only receive SMS text messages or voicemail during such times but may forget to configure the communications device to respond to only text messages or take voicemail.

It is also the case that the times when a user would not wish to be disturbed, such as when in a meeting or by business calls when at home are often characterized by the user in a particular location, with particular people and/or when the user is exhibiting particular behavior or a particular type of use of the device. Such things may be considered to represent the context in which a user is using the communications device.

SUMMARY

The disclosed embodiments are of a data processing apparatus including a sensor, and a context engine module. The sensor generates a sensor output signal representative of a value for one or more context aspects of the data processing apparatus and a confidence factor associated with each of the values for the one or more context aspects. The context engine module processes the sensor output signal to generate and make available a final value for one or more context aspects of the data processing apparatus.

In one or more embodiments, a method of operating a data processing apparatus is provided. A sensor output signal is generated representative of a value for one or more context aspects of the data processing apparatus and a confidence factor associated with each of the values for the one or more context aspects. The sensor output signal is processed to generate and make available a final value for one or more context aspects of the data processing apparatus.

In one or more embodiments, a computer program product is provided. The computer program product is configured to perform an operation in accordance with the final value for the one or more context aspects of the data processing apparatus. The one or more context aspects may be selected from the group of the availability, activity and location of the data processing apparatus.

In one or more embodiments, the data processing apparatus includes a plurality of sensors.

In one or more embodiments, the data processing apparatus includes a mobile computing device.

In one or more embodiments, the data processing apparatus further includes a context aspect database storing a list of context aspect values. The context aspect database may comprise an availability database storing a list of pre-defined availability values. The context aspect database may further include an activity database having stored thereon a list of user-defined activity values; and/or a location database having stored thereon a list of user-defined location values. The final value for one or more of the context aspects, activity, availability and/or location of the user of the data processing apparatus may comprise a value from one or more of the respective context aspect database, activity database, availability database and location databases.

In one or more embodiments, the sensor output signal represents a value from one or more of the context aspect database, the availability database, the activity database and the location database.

In one or more embodiments, the context engine is configured to provide feedback to the sensor module such that a confidence factor associated with values represented by the output signal is adjusted.

In one or more embodiments, the data processing apparatus includes a sensor database storing a list of sensors that generate a sensor output signal and an accuracy score associated with those sensors. The context engine is configured to use the accuracy score to generate a weighting factor to be applied to the sensor output signal to generate the final value for the one or more context aspects of the data processing apparatus.

In one or more embodiments, the sensor output signal represents system data. The context engine may make available the system data such that the application program may be configured to perform an operation in accordance with the system data.

In one or more embodiments, the application program includes one or more of a personal information manager (PIM) application, a calendar application, a contacts application, an instant messaging (IM) application, and a mobile telephony application. The sensor may also be a plug-in.

In one or more embodiments, the final value for one or more context aspects, which may be the activity, availability and location of the user of the data processing apparatus, may have one or more respective confidence values associated with it.

In one or more embodiments, the data processing apparatus includes one of a mobile computing device, a mobile telephone, a personal digital assistant, a personal computer and a laptop.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 4 illustrates a sensor according to one embodiment.

FIGS. 5A-D illustrate a sensor according to another embodiment.

DETAILED DESCRIPTION

Figure 1:
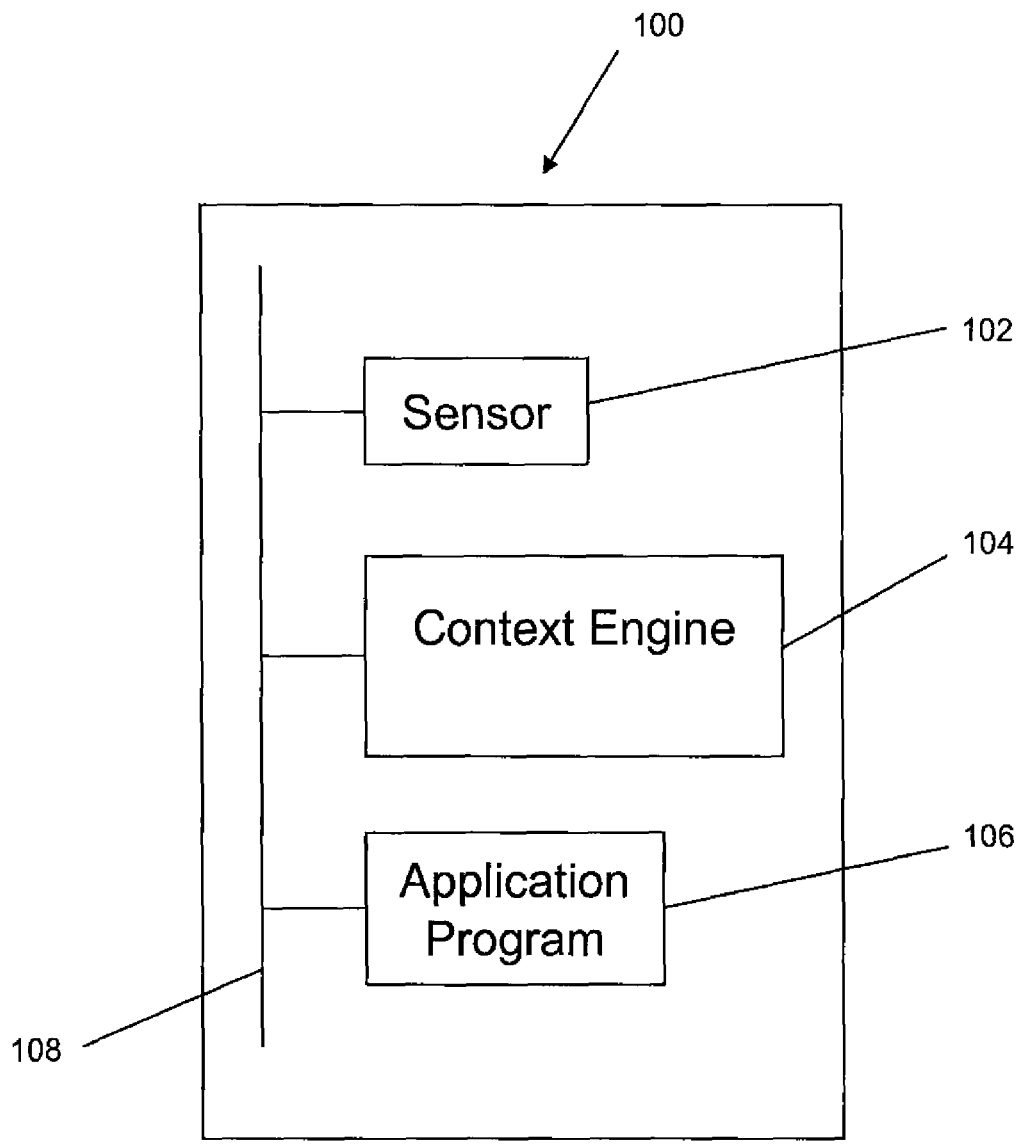
FIG. 1 illustrates a data processing apparatus according to one embodiment.

The embodiments described herein will be with reference to the accompanying drawings where feasible, like reference numerals are used for like elements in the accompanying drawings.

Embodiments described herein describe a data processing apparatus having one or more sensors, a context engine core/module, and optionally one or more application programs. The sensors process data detected/perceived by that sensor and generate a value for one or more context attributes/aspects of the apparatus including availability, activity, and location/area along with a confidence factor for each of these attributes. The context of the apparatus may be used to infer the context of a user of the apparatus. The sensors provide this data to the context engine core, and one or more of the attributes may be considered as representing the context in which the data processing apparatus is being used. The context engine core processes the data received from the one or more sensors and make available a value for a context aspect, for example to make available a value for a context aspect to the one or more application programs such that operation of an application program may be effected in accordance with the context in which the data processing apparatus is being used.

In one or more embodiments, one or more of the sensors may be the same computer software programs as one or more of the application programs such that the operation of an existing application program can be utilized to provide contextual information to enhance the operation of that or other application programs.

One or more of the sensor(s), context engine core and application program(s) may be implemented as individual modules in order to facilitate addition of the modules to the overall system and removal of modules from the overall system. Alternatively, the functionality of one or more of the sensor(s), context engine core and application program(s) may be combined as a single module/object that functions in the same way. Embodiments described herein are not limited to the specific hardware/software implementations illustrated in the drawings.

FIG. 1 illustrates an embodiment of a data processing apparatus 100. The data processing apparatus includes a sensor 102, a context engine module 104, and an application program 106. The sensor 102, context engine 104 and application program 106 are all communicatively coupled to data bus 108.

The sensor 102 detects properties indicative of one or more context aspects, including the activity, availability, and location of a user that is using the data processing apparatus 100. The activity, availability and location may be considered as relating to the context in which the data processing apparatus is being used.

An example of a sensor for detecting a user's activity includes a telephone communications application program. For example, the telephone communication application program acting as a sensor can detect whether or not the telephony application is in use on a call. If it is determined that the telephony application is in use, the activity of the user using the data processing apparatus may be recorded as "on the phone" by the sensor.

An example of a sensor that detects the availability of a user using the data processing apparatus 100 includes a ringer switch on a mobile telephone. If a sensor associated with the ringer switch determines that the ringer switch is set to silent, the sensor may record the availability of the user as "do not disturb."

An example of a sensor detecting the location of a user includes a GPS (Global Positioning System) sensor. The sensor compares the current GPS coordinates of the user with predefined GPS coordinates stored in memory to determine if the current location is associated with known locations such as "at work", "at home" or "at the gym."

Further examples of application programs that can be used as sensors are described below. A sensor can be any component/module that is capable of detecting a context aspect/attribute, which may be a characteristic that is representative of the use of a data processing apparatus. The characteristic may be related to the operation of the data processing apparatus and/or the environment in which the data processing apparatus is used, for example.

In one or more embodiments, a sensor may detect one or more of the following three types of data: statistical; event; and environmental.

Detecting statistical data may include performing analysis of previous events and determining a value for an attribute based on that analysis. For example, if the last 100 received telephone calls were not answered (or greater than any predefined threshold), the sensor may determine that the location of the data processing apparatus is "lost" and/or the availability is "unavailable."

Detecting event data may comprise identifying/spotting a pre-determined value or sequence of detected data. An example of an event is the detection of a user pressing alphanumeric keys on the data processing apparatus which may cause an activity value of "typing" to be set. Further still, the data processing apparatus may detect that an email application program is opened before key presses are detected and this may cause an activity value of "typing an email" to be set.

An example of detecting environmental data includes a microphone capable of detecting ambient noise, for example, to determine whether or not the location of the user of the data processing apparatus is "in the factory." If the user is "in the factory," the operation of a telephony application may be controlled such that the alert for an incoming call is set at a high volume.

Embodiments of the sensor may be considered as utilizing data that is pre-existing in the data processing apparatus such that an aspect of the context of the use of the data processing apparatus can be determined/estimated and the existing data/information may be utilized in a secondary way. The sensor may be configured to process data and aggregate it into one or more contextual attributes such as availability, activity and location. The sensor may process data in order to provide one or more output values in one or more context categories.

In addition to the value for the activity, availability and/or location attributes, the sensor 102 is also configured to provide a confidence factor indicative of the likelihood that the value for that attribute is correct.

The context engine module 104 is configured to process the received data from the sensor 102 to determine an overall/final value for the context aspects, which in this embodiment are activity, availability and/or location of the user of the data processing apparatus 100. In embodiments where a plurality of sensors 102 are present, the context engine module 104 may be configured to resolve any inconsistencies in the data received from the sensors 102 and optionally to provide feedback to the sensors such that the corresponding confidence factors may be increased or decreased depending upon whether or not the sensor generated the correct context attribute value.

The confidence factor can be used by the context engine module 104 when determining a final value for that attribute, for example, if different sensors generate signals indicative of different context attribute values.

The operation of the application program 106 is controlled in response to the determined overall values for one or more of the context aspects determined by the context engine module 104.

An example application program 106 includes a calendar application program that is set up to remind the user of a meeting at 10 am in meeting room one with an alert 15 minutes before the start of the meeting. In one embodiment, the operation of the calendar application program may be controlled such that the alert is not made if the value of the location of the user as determined by the context engine module 104 indicates that the user is already in meeting room one when the reminder is due. That is, the context of the user is taken into account by the application program when performing an operation, or determining whether or not to perform an operation.

In this way, the data processing apparatus 100 may be user-friendly as the performance of the application program 106 may be tailored to the real-world context of a user, as opposed to an intended location of the user based upon time, for example. A user's appointments may not always run to schedule, and that a data processing apparatus 100 that can automatically effect the operation of the application program in line with the context of the user can be less intrusive to the user and may provide more efficient operation of the application program that may be less susceptible to errors. Embodiments described herein can provide that an event occurs at the "right time", and the "right time" may be determined as contextually the correct time for the user, which may be different to the correct time of day.

Figure 2:
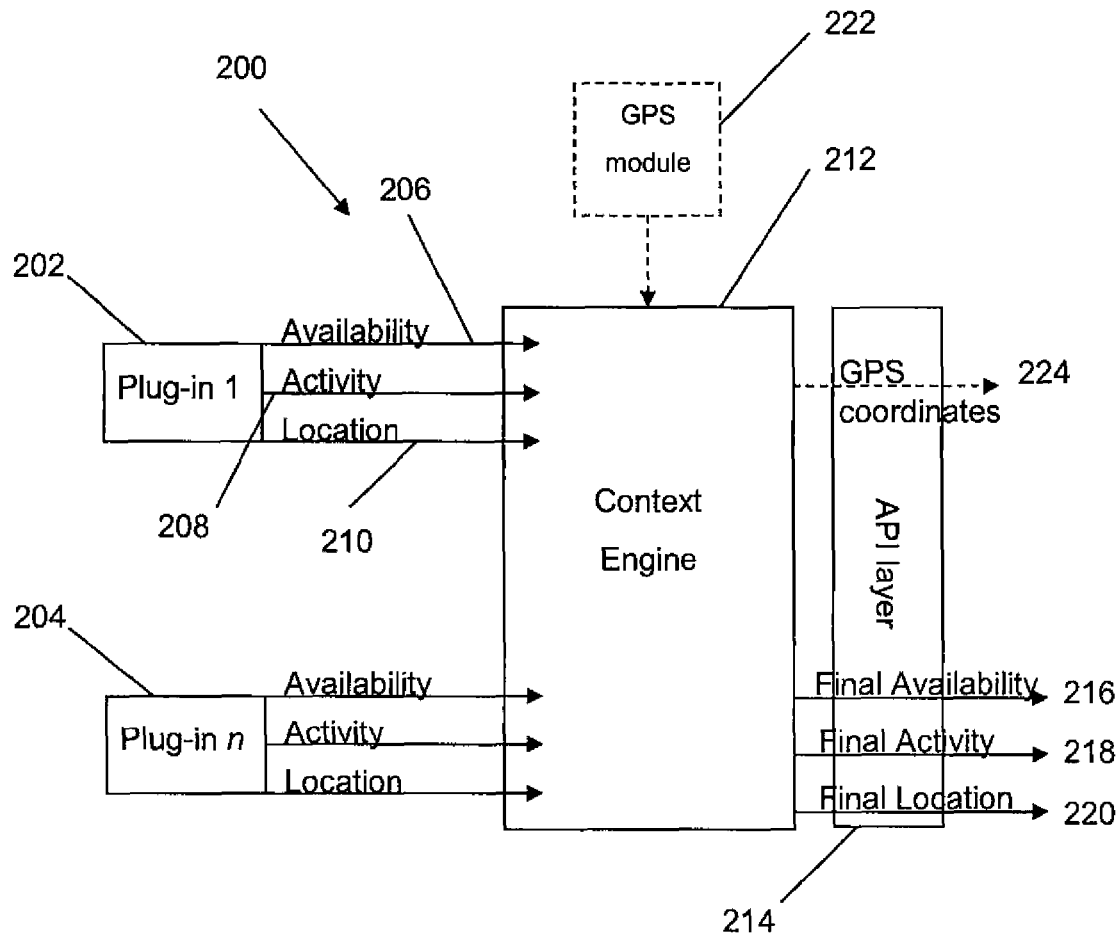
FIG. 2 illustrates a data processing apparatus according to another embodiment.

FIG. 2 shows a data processing apparatus 200 according to another embodiment. The data processing apparatus 200 comprises two plug-ins 202, 204, a context engine 212 and an application program interface (API) layer 214.

The plug-ins 202, 204 are embodiments of the sensor 102 illustrated in FIG. 1. The plug-ins 202, 204 may be considered as computer programs interacting with the data processing apparatus 200, and can be added to, or removed from, the data processing apparatus 200 in order to add or remove corresponding functionality. The embodiment illustrated in FIG. 2 comprises the context engine 212 between the plug-ins 202, 204 and the application layer 214 in order to generate final context values 216, 218, 220 from the individual context values 206, 208, 210 generated by the plug-ins 202, 204.

Each plug-in 202, 204 provides the context engine 212 with signals representative of context aspects/attributes. In one or more embodiments, three signals are provided: one representative of availability 206, one representative of activity 208, and the third representative of location 210. The plug-ins 202, 204 provide the context engine 212 with a value for each of these three attributes 206, 208, 210 along with a confidence factor for each value, and the context engine 212 is configured to process the values received from all of the plug-ins 1-$n$ 202, 204 to determine final values for the availability 216, activity 218 and location 220. These final values 216, 218, 220 represent the determined context of the use of the data processing apparatus 200 and are provided as input signals to application programs via the application layer 214 such that the application programs can operate in accordance with the context of the data processing apparatus 200 as determined from the final values for availability, activity and location 216, 218, 220.

The context engine 212 may generate the final output signals 216, 218 and 220 by determining the most likely value from the input signals 206, 208, 210 received from the plug-ins 202, 204. In one embodiment, this may involve selecting the value that occurs most often in the input signals 206, 208, 210 received from a plurality of plug-ins 202, 204 and further still may involve selecting the value that is present in the received input signals 206, 208, 210 with the highest confidence. For example, the confidence factors for each received value may be summed and the value with the highest confidence total may be selected as the final value. Optionally, the single value having the highest confidence factor for that attribute may be selected as the final value to the exclusion of other values with lower confidence factors. In some embodiments, a value having a confidence value of 100% may always be selected as the final value.

In one or more embodiments, the sensor output signals 206, 208, 210 represents values that are native to the plug-in/sensor 202. The values that are output by a plug-in 202 may be selected from a local list of values that are specific to that plug-in 202. In such an embodiment, the context engine 212 may be configured to process each of the native sensor output signals and generate a generic final value for one or more of the activity, availability and location and make available those generic final values. For example, the context engine 212 may use a look up table (LUT) to translate native values into generic values. Optionally, the context engine 212 may make available one or more of the native values for activity, availability and location in addition to, or instead of, the generic final values.

In one or more embodiments, user input representative of the value for a context aspect such as activity, availability or location may be selected as the final value irrespective of the value that is automatically determined by the context engine 212. This allows a user to overrule automatically determined final values, and is useful in embodiments configured to automatically learn how to better select the final values 216, 218, 220 such as by using artificial intelligence, as described in detail below.

In one or more embodiments, selecting the final values 216, 218, 220 involves applying a weighting to the values 206, 208, 210 received from certain plug-ins 202, 204. For example, plug-in 1 202 may be considered as particularly reliable, and therefore the outputs of plug-in 1 202 may be given a high weighting when the context engine 212 generates the final output signals 216, 218, 220. An example of how sensor weighting can be used is described in more detail below.

The data processing apparatus 200 may optionally comprise a GPS module 222 as shown in dashed lines in FIG. 2. The GPS module may or may not be considered as a plug-in 202, 204 and may provide an input signal to the context engine 212 such that the context engine can make available GPS co-ordinates 224 to application programs via the API layer 214.

Figure 3:
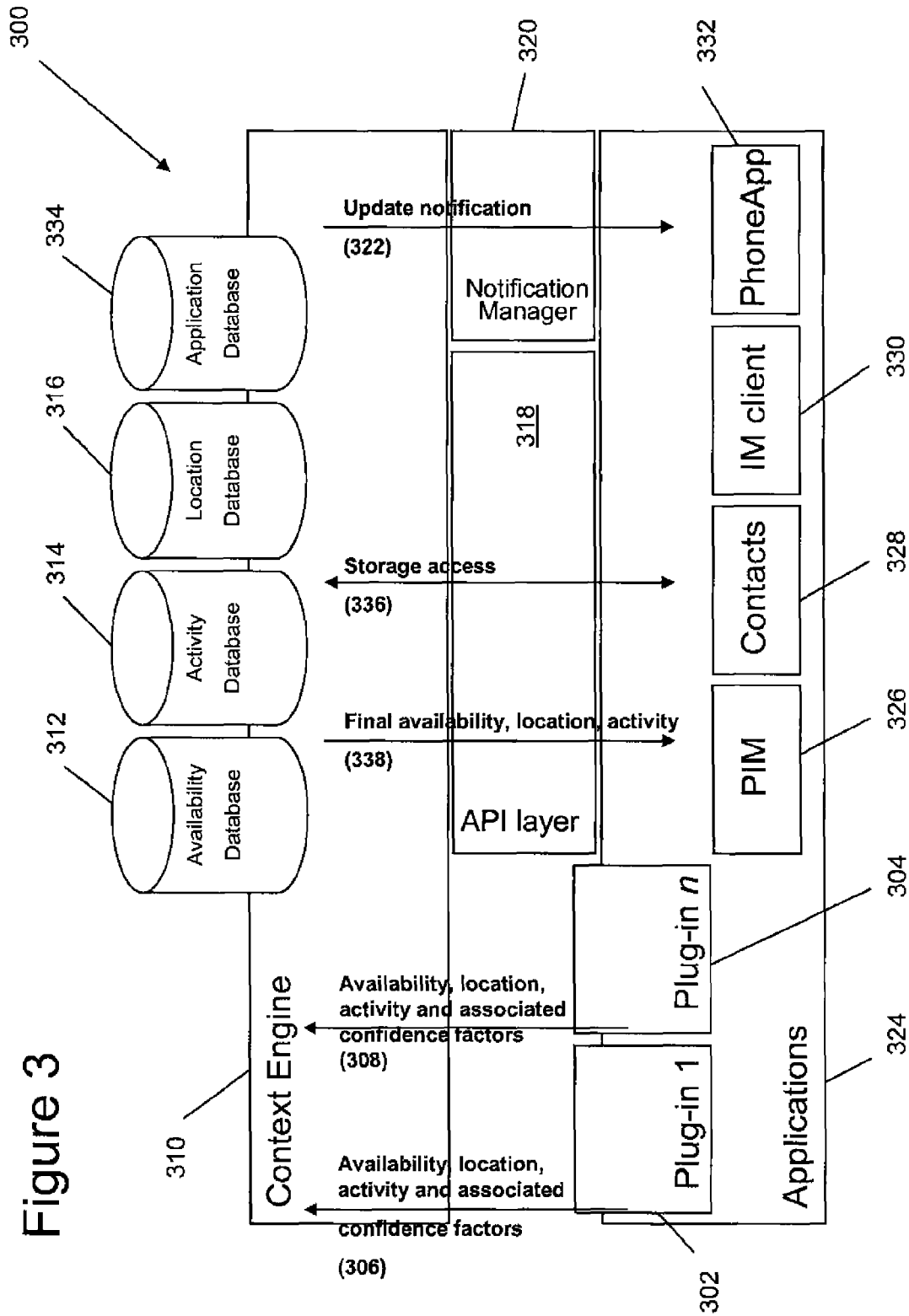
FIG. 3 illustrates a data processing apparatus according to still another embodiment.

FIG. 3 illustrates yet another embodiment of a data processing apparatus 300. The data processing apparatus 300 comprises two plug-ins 302, 304, a context engine module 310, an API layer 318, a notification manager 320 and application programs 324.

The context engine module 310 has access to a context aspect database for each context that it is configured to process. In this embodiment there are three context databases: an availability database 312 that stores pre-defined availability icons, an activity database 314 that stores user-defined activity names, and a location database 316 that stores user-defined location names. In addition, there is also an applications database 334 that stores a list of applications that have registered to receive notifications in relation to the context of the data processing apparatus 300. In some embodiments, the context aspect values stored in databases 312, 314, 316 may not be pre-defined or user-defined but may be automatically system-defined, for example through use of artificial intelligence processing as described below. The context engine 310 can centrally manage the databases of context aspect values 312, 314, 316, which may include adding new values into the databases 312, 314, 316 that are returned by one or more of the plug-ins 302, 304.

The availability database 312 stores one or more values for availability/presence status. The values that are stored in availability database 312 may be a generic set of presence values, or may be native to an application program. Non-limiting examples of availability values can include "available", "do not disturb", and "offline".

Examples of user-defined activity names that can be stored in activity database 314 include "driving", "typing", "in a meeting" and "on holiday" and a user can provide an association between the named activities and data that can be detected by one or more of the plug-ins 302, 304. For example, a plug-in 302, 304 can be configured to automatically set the activity of the user as "driving" when the plug-in detects that the data processing apparatus is docked in a cradle in a car.

Examples of location names that can be stored in location database 316 include "at home", "at work", "in the gym", and "in the car", and the user can pre-store an identifier of a location with the location name. Non-limiting examples of the identifier may be GPS coordinates, identifiers of signals received from one or more Bluetooth devices, and/or signals received from any other transmitting beacons.

An application program that can utilize context information may be automatically added to the applications database when it is installed onto the data processing apparatus, and/or a user can manually add identifiers of one or more application programs to the applications database 334 such that the context engine 310 can make available final values for the context attributes to the application programs identified in the applications database 334.

Each of the plug-ins 302, 304 are configured to determine which of the availability, location and activity values stored in databases 312, 314, 316 are most likely to accurately reflect the context of the user that is using the data processing apparatus by processing data detected locally by that plug-in 302, 304. The most likely value determined by a plug-in 302, 304 may be considered a best guess based upon algorithms performed upon the detected data.

Each of the values for availability, location and activity returned by the plug-ins 302, 304 are accompanied with a confidence factor for that value. For example, a plug-in 302, 304 that can detect data that is particularly relevant to availability and activity, but not location, can have a high confidence factor for availability and activity, and a low confidence factor for location. This can enable the context engine 310 to efficiently utilize the values received from a plurality of plug-ins 302, 304, and take advantage of particular strengths associated with particular plug-ins 302, 304 without giving undue consideration to values of attributes that cannot be accurately determined by the plug-in 302, 304.

Each plug-in 302, 304 sends a signal 306, 308 representing the locally determined availability, location and activity context aspects with associated confidence factors to the context engine 310.

The context engine 310 then processes each of the signals 306, 308 received from the plug-ins 302, 304 to generate a final value for the availability, location and activity that represent the context of use of the data processing apparatus. Each of the final values are values from the lists in databases 312, 314, 316.

After the final values for the context aspects of availability, location and activity have been determined they are made available for the application programs 326, 328, 330, 332 that utilize the context information. In this embodiment, the application programs are a Personal Information Management (PIM) application 326, a contacts application 328, an Instant Messaging (IM) application 330 and a phone application 332. In one or more embodiments, the contacts application 328 and/or a calendar application (not shown) may be a subset of the PIM application 326. The final values may be made available by broadcasting the values to the applications that are registered in application database 334, or by storing the values in a pre-allocated location in memory such that they can be retrieved from the location in memory by those application programs that utilize context information.

In one embodiment, after the context engine 212 has determined the final availability, activity and location, it provides an update notification signal 322 to each application program that is listed in application database 334 as registered to receive context information. After receiving the notification signal 322, an application program 326, 328, 330, 332 may send a storage access request signal 336 to the context engine 310 to retrieve the final context aspect values for availability, activity, location from memory, as illustrated as signal 338. In one or more embodiments, the individual application programs may retrieve the final availability, activity, location values as signal 338 periodically and/or in response to a predefined local event occurring as determined by the application program 326, 328, 330, 332.

One or more of the plug-ins 302, 304 may also be an application program that utilizes context information such as application programs 326, 328, 330, 332, which may be the same computer software modules stored in memory. This is illustrated graphically in FIG. 3 whereby plug-ins 302, 304 are shown partly within the applications module 324.

As an example, a telephony application program may be both a plug-in configured to operate as a sensor and an application program that utilizes context information. The telephony application program may be capable of sensing/detecting whether or not the application is in use, and therefore, provide a representation to the context engine that the activity of the user is "on the phone". Similarly, when the context engine determines that the availability of a user is "do not disturb" the operation of the telephony application program may be controlled such that any incoming calls are directed to voicemail so as not to disturb the user.

FIG. 4 illustrates a sensor 400 according to one embodiment. The sensor 400 has access to a database of known locations 402, a database of known activities 404 and a database of availability icons 406. The known values may be user-defined, pre-defined, automatically determined over time and/or a combination thereof. The three databases 402, 404, 406 correspond to databases 312, 314, 316 illustrated in FIG. 3, and may be reproduced locally for the sensor 400 or may be retrieved by the sensor 400 from global databases associated with the context engine.

The sensor 400 may be configured to detect characteristics of an environment, for example, physical characteristics of an external environment such as temperature, light, sound and/or may be configured to detect internal characteristics of a processing or application environment such as an application program corresponding to the sensor 400 that is being run on a data processing apparatus or the state of a data processing apparatus, or a combination thereof. For example, the sensor 400 may determine whether or not the corresponding application program is in use, to what degree it is in use and/or how it is in use depending upon the application program.

The sensor 400 is configured to process the detected characteristics and allocate a value from the respective databases 402, 404, 406 as a "best guess" for one or more of availability, activity and location of the context of the use of the associated data processing apparatus. Examples of different types of sensor, and values for the location, activity and availability that can be determined by those sensors are provided below.

In addition to determining the "best guess" value for each of the availability, activity and location 408, 412, 416 of the context of use of the data processing apparatus, the sensor 400 also attributes a confidence factor 410, 414, 418 to each of those values 408, 412, 416. The confidence factor for each of the attributes (availability, activity, location) may be pre-defined for the sensor 400 in question, or may be allocated based upon the detected characteristics. For example, a sensor may be particularly suited for determining the location of the data processing apparatus; and therefore, the location guess signal 416 is attributed a high confidence factor 418, whereas the confidence factors 410, 414 associated with the availability guess and activity guess respectively may be set at low values, or be set at zero. Additionally and/or optionally, the confidence factor associated with an attribute value may be determined in response to the detected characteristics. For example, if the sensor 400 detects geographical coordinates that relate to the periphery of a known location stored in database 402, the location guess value 416 may be attributed a reduced confidence factor 418, for example, 50% depending upon how close to the periphery of the location the data processing apparatus is.

The availability guess 408 may represent an availability icon that belongs to a global (system-wide accessible) set of availability icons. The activity guess 412 may represent an activity name that belongs to a global list of activity name strings. The activity name may be nothing more than a string as it may serve purely as an identifier of the activity. The location guess 416 may represent a location name that belongs to a global list of location name strings.

The sensor 400 may be configured to periodically process the detected characteristics to generate and transmit the values for each of the availability, activity and location 408, 412, 416, and/or may generate and transmit the values for availability, activity and location 408, 412, 416 when an event is determined or when one of the values 408, 410, 412 or associated confidence factors 410, 414, 418 changes.

Example sensors will now be described with relation to FIGS. 5A to 5D.

FIG. 5A illustrates a ringer switch 502 as a sensor according to one embodiment. In this embodiment, the ringer switch 502 is configured to provide a value for the availability in the context of the user of the associated data processing apparatus as "best guess availability icon" signal 504. In the example illustrated in FIG. 5A, the best guess availability icon signal 504 represents an available icon such as a smiley face, and has an associated prediction confidence factor 506 of 100%. The ringer switch 502 in this embodiment is not configured to provide a best guess of the activity name and location name and therefore has corresponding prediction confidence factors of 0%.

FIG. 5B illustrates a phone application 520 as a sensor according to one embodiment. The phone application 520 may also be an embodiment of an application program that utilizes context information. The phone application as a sensor is configured to provide a best guess of the activity of the user, for example, whether or not the user is on the phone as indicated by signal 526 with a corresponding prediction confidence factor 528 of 100%. The phone application 520 is not configured to provide a best guess of the availability icon or location name as indicated by prediction confidence factors 524, 532 of 0% for the best guess signals for the availability icon and location name 522, 530, respectively.

Figure 5C:
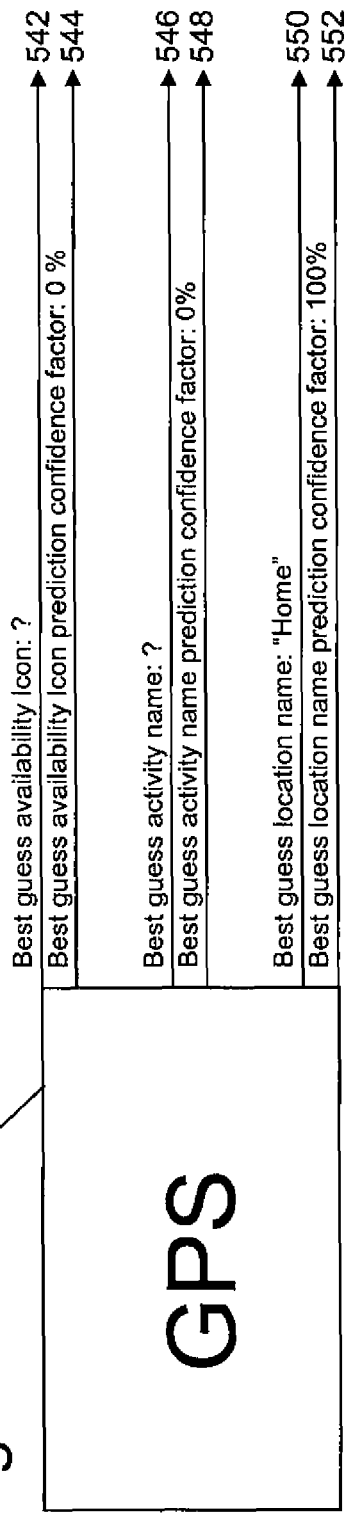

FIG. 5C illustrates a GPS sensor 540 that provides a best guess of the location of the user of the data processing apparatus. For example, the GPS sensor 540 may provide a best guess location name of "Home" 550 with an associated prediction confidence factor 553 of 100%. The best guess location name may be determined by looking up detected GPS coordinates in a "known locations" database and determining the closest known location to those coordinates. If the coordinates match exactly, the prediction confidence factor may be given a value of 100%, and a reduced confidence prediction factor may be allocated if the coordinates do not match exactly.

Figure 5D:
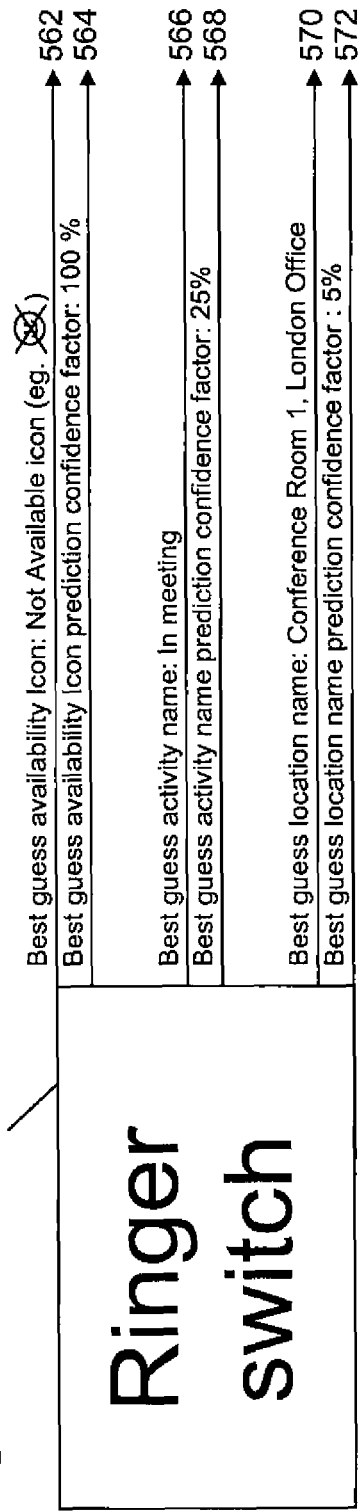

FIG. 5D illustrates using a ringer switch 560 as a sensor according to one embodiment. In this embodiment, the ringer switch 560 provides a best guess for each of the availability icon, the activity name and location name in the context of the use of the data processing apparatus. The value represented by the best guess availability icon signal 562 may be set as "not available" (which may be displayed to a user as a smiley face with a cross through it) if the ringer switch is in the silent position. If this is the case, the best guess availability icon prediction confidence factor 564 may be allocated a value of 100%.

Furthermore, if the ringer switch is in the silent position, the ringer switch sensor 560 may provide a best guess activity name signal 566 as "in meeting". This best guess activity name may be determined statistically based upon, for example, the time of day and the likelihood that the user has a meeting at that time. In this example, the best guess activity name prediction confidence factor 568 is set at 25% to account for potential errors in the statistical analysis. The statistical analysis may generate different results with different confidence factors over time as the data on which the statistical analysis is performed changes.

Further still, the ringer switch sensor 560 is configured to provide a best guess of the location name based upon further statistical analysis. In this example, the best guess location name signal 570 represents "Conference Room 1, London office" with a confidence factor 572 of 5%.

In one or more embodiments, the ringer switch sensor 560 may also receive an input from a calendar application program indicative of a user's appointments that can be used when determining the most likely activity and/or location of the user.

As another example, the ringer switch sensor 560 may provide a best guess that the user is at home (location) and asleep (activity) if it is the middle of the night and the ringer switch 560 is on silent.

The sensor can select the statistically most likely availability, activity and/or location, and provide an associated confidence factor that represents a degree of confidence in the results of the statistical analysis.

A list of example sensors along with associated context attributes and example uses of the sensor determined values is provided in the table below:

| Sensor | Context Attributes | Example Use of Sensor Determined Values |
|---|---|---|
| Microphone | Activity | Ambient noise. |
| Keyboard | Activity, Availability | Frequency of keypresses, Application that is currently running that received the keys. Distinction can be made between navigating and text entry. |
| Digitizer | Activity, Availability | Use of frequency of taps, and/or use of the application that is currently running that receives the taps. |
| Currently open application database | Activity, Availability | Currently open application use statistics; e.g. taking photo is busy, typing e-mail is less busy, playing MP3 is not busy. |
| Wireless radio | Activity, Availability, Location | Determine environment by paired devices, Bluetooth 'cloud' or global or local network access points. |
| Network traffic | Activity, Availability | Use network protocols, ports or APN to predict activity. E.g. Skype is busy, port 80 (http) is busy, smpt in/out is busy. |
| Cellular and/or GPS movement | Activity, Availability, Location | Use movement between GSM cells or changing GPS coordinates to predict activity, availability and location. |
| GSM signal strength | Activity, Availability | Use rapid changes in signal strength to detect local 'movement'. |
| Car Kit | Activity, Availability, Location | The connection to a car kit to predict activity ('driving'), availability ('available'?) and location ('in car'). |
| Activity log | Availability | Use of missed calls, texts and their history in time to predict availability. |
| GPS signal | Location | Interpreting poor GPS signal to identify location as indoors. |
| Connected accessories | Activity, Availability, Location | Use of headset (stereo, mono, car kit, network such as Bluetooth) for example to determine that "I'm at work when I wear a Bluetooth headset" as activity, availability and location. Would make use of more sources like callog, time of day, charging habits, datebook entries, task deadlines, etc. |

Examples of application programs and how they can utilize context information are provided in the list below:

Ordering of bookmarks;

Automatic ringtone setting/silencing;

Which mail account to go to first;

Screen resolution, font, zoom and orientation;

Security features associated with "I am forgotten", "I am left behind", "I am lost";

Datebook/Calendar Tasks such as "remind me when I'm not there yet", "remind me when I get there"; and Conserving battery power and automatically enabling/disabling services such as wireless networking (WiFi), radio, and telephony network applications.

In one embodiment, there may be provided a calendar appointments application program on a data processing apparatus. Reminders that can be set through the calendar appointments application program to alert the user that they need to be somewhere not at N−15 minutes but at N−(time to get to appointment from the user's current location). If the user is already at the appointment location, no alarm may sound (except perhaps at time N, as a discreet reminder).

In one embodiment, a portable GPS car navigation system may also be present on the data processing apparatus. The portable GPS car navigation system may be used, for example, to adjust the journey time for heavy traffic. Further still, there may also be provided an artificial intelligence (AI) plug-in and the context engine can effectively learn the average time it takes to get from A to B on a given day or time (possibly taking mode of transport invisibly into consideration) and use this average time as part of the contextual operation of the application program.

In one embodiment, a To-Do/Tasks list application program may be provided on a data processing apparatus that provides reminders for certain locations. As the user passes such locations as determined from the context of the data processing apparatus, they are reminded of the task in question. For example, a user's grocery list would fall "due" as they entered the store; a user's daily workload would fall "due" once they got to the office.

Adding alternative location triangulation technologies, such as Bluetooth proximity may further enhance location resolution indoors. In one or more embodiments, Bluetooth proximity can provide information relating to one or more of activity, availability and location. For example, a Bluetooth application may detect when a user is having a team meeting by recognizing the Bluetooth IDs of fellow team members, and not necessarily the location of the meeting.

In one or more embodiments, application programs providing assisted location information to a user may be used as sensors to provide location values for subsequent use by a context engine of an embodiment described herein. For example, Assisted GPS (AGPS) may be used to provide reliable location information to a user in poor signal conditions, such as when surrounded by tall buildings or when indoors. An AGPS module is an example of a sensor that can provide location information to the context engine and may have an associated confidence factor that is higher than for a corresponding non-assisted GPS sensor. Other radio and optical application programs/methods may also be used as sensors to provide assisted location/position information, and confidence factors can be pre-defined or adjusted over time accordingly.

Other To-Do list application program examples can include "Pick up flowers when I leave here" such that a reminder is provided when the user leaves the current location, "Pick up flowers when I'm done working" such that a reminder is provided when the activity of the user changes from "working" to something else, "Go to Ted's office when I get to work," "Hide Christmas presents when I'm at home alone," and "Buy chocolates for the wife when I'm at the airport."

Some example operations of an application program may be set as recurring tasks. For example, an action may be performed to provide the user with a reminder, each time a context event/scenario/value is determined. A To-Do list application program may provide the user with an alert to "buy perfume" each time the location of the user changes to "in the airport" or "in airport duty free shop" or may perform an action/operation each time the user is "home alone." Further refinement may be provided by setting a task as a recurring task as long as another criteria is satisfied, for example, "every time I am near the florist, as long as I am in the car", and "the first time in each calendar month that I am in an airport".

In one or more embodiments, Instant Messaging (IM) application programs are used. For example, the availability can automatically be set to "away from keyboard" when the user is driving, "available for personal purposes" when the user is not working, and "available for business purposes" when the user is in the office.

For a telephone communications application program, the telephone communications application may automatically screen calls when the user's activity is "on holiday" such that only non-corporate contacts get through, and all other calls are directed to voicemail, may screen calls such that the telephone rings only when the boss calls when the availability is "do not disturb", and may divert all calls to voicemail if the user is driving and the mobile telephone is not connected to a hands-free kit in the vehicle.

A Bluetooth application program may be automatically shut down when the user is "not working" in order to preserve battery life.

These examples may provide embodiments wherein an existing time-based model can be enhanced by adding activity-based, availability-based and/or location-based models.

One or more embodiments may enable a user to save time and/or costs whilst roaming—that is whilst using a mobile communication device abroad. The operation of application programs is controlled to re-route dial-in telephone calls for meetings/conference calls to the appropriate country access point, use conferencing facility access numbers for the local country, prompt the user to ask if wake-up alarms should move to the local time zone. In some embodiments, a local country and/or area may be derived from a simple plug-in that provides location information based on network identities, such as MCC/MNC codes. This may be used as well as, or instead of GPS location information.

Figure 6:
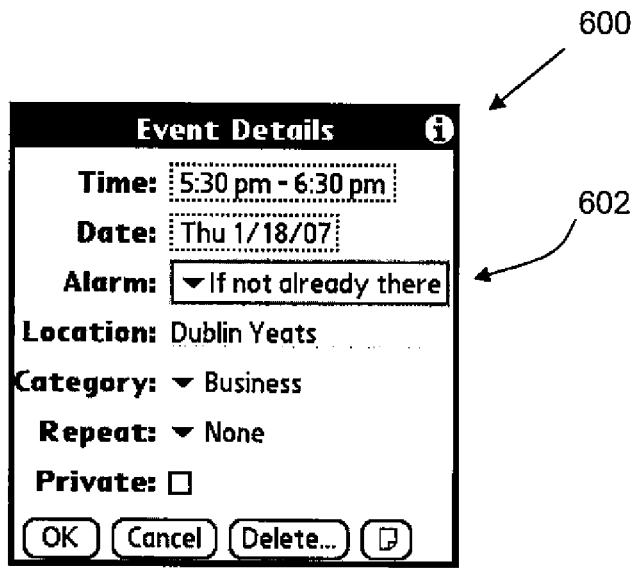
FIG. 6 illustrates a graphical user interface of an application program according to one embodiment.

FIG. 6 illustrates a graphical user interface 600 that can be used with an application program that utilizes context information, according to one embodiment. The graphical user interface (GUI) 600 enables a user to input details of an event such as a meeting, and set an alarm associated with that event. In this example, the context information is provided with an alarm parameter/variable 602. As shown in FIG. 6, the alarm parameter is set with a value "if not already there", and in order to perform this operation the data processing apparatus must have access to context information to determine whether or not the data processing apparatus is at the location of the event, and this contact information can be provided by an embodiment described herein.

In other embodiments, the alarm parameter may be set as "15 minutes before I have to leave", and in such an embodiment the location of the data processing apparatus is used to determine how long it will take the user to get to the location of the event from a current location, and calculate a suitable alarm time accordingly. In another embodiment, the alarm parameter may be set as "24 hours before the event, but only when I am not driving", and in such an example the activity of the user is taken into account to ensure that an alarm is not provided whilst the user is driving as this may be unsafe and the alarm may be subsequently forgotten as the user cannot act upon the alarm immediately.

Figure 7:
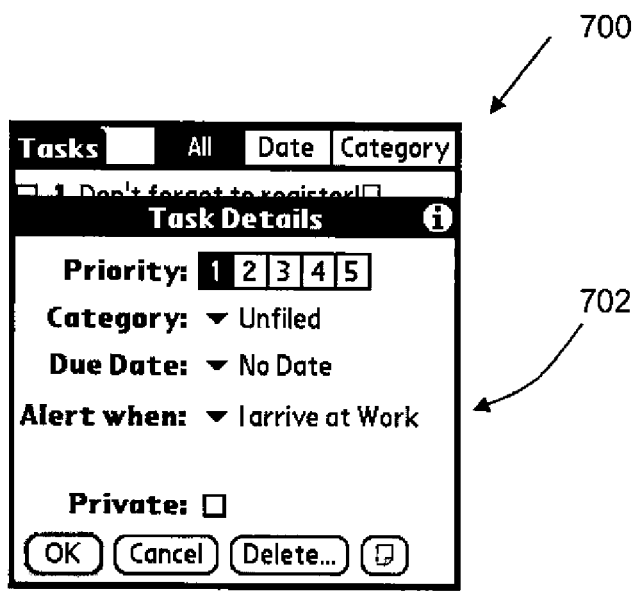
FIG. 7 illustrates a graphical user interface of an application program, according to one embodiment.

FIG. 7 illustrates an embodiment of a graphical user interface (GUI) 700 associated with a task that can be set by a user, along with an "alert when:" parameter 702. In the example illustrated in FIG. 7, the "alert when:" parameter is set to utilize location context information to determine when the user of the data processing apparatus arrives at work. For example, a Bluetooth application program present on the data processing apparatus may be used to identify when the data processing apparatus comes into range of other Bluetooth devices that are known to be present in the user's office, and thereupon determine that the location of the user is "at work."

Figure 8:
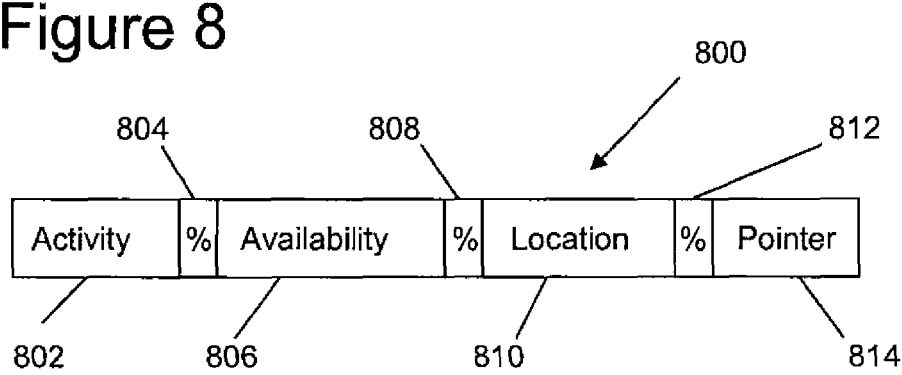
FIG. 8 illustrates a data signal, according to one embodiment.

FIG. 8 shows an example of a data signal 800 that can be generated by a sensor, such as a combination of the signals 206, 208, 210 in FIG. 2.

The data signal 800 includes data representative of a value for activity 802 with data representative of an associated confidence factor 804, data representative of a value for availability 806 with data representative of an associated confidence factor 808, and data representative of a value for location 810 with data representative of an associated confidence factor 812. The data signal 800 may also comprise values and associated confidence factors for any other context aspects that can be detected by the sensor and/or processed by the context engine.

The data signal also includes a pointer 814 to a data structure containing system/extended data, for example, in the form of a linked list. The system data may be provided with one or more confidence factors indicative of a degree of confidence in the values represented by the system data. In one embodiment, the data structure may comprise one or more data bits that can be set to provide an indication of system data such as events and settings. The system data may be representative of internal or external characteristics of the data processing apparatus. The data structure may be an array of data bits. For example, a data bit may provide an indication of whether or not it is raining with a '0' representing that it is not raining, and a '1' indicating that it is raining. Optionally, a combination of data bits within an array may provide more details of the weather. In some embodiments, one or more of the data bits may provide an indication of whether or not Bluetooth is transmitting, a mobile telephone is roaming such as when it is being used abroad, the data processing apparatus is tilted, battery level, a value for the Dow Jones index, and/or any other characteristic or updateable information that can be utilized by an application program. In some embodiments, the data bits may provide a value that is an indication of a subjective context aspect such as the mood of a user, and this may be obtained by the sensor performing an algorithm that processes detected data that is considered as reflective of a user's frame of mind.

The system data represented by the data structure that is pointed to by pointer 814 may provide a further level of detail that can be used to control the operation of one or more application programs. For example, an appointment to go hot air ballooning may be automatically cancelled, or a user may be prompted to ask whether or not they wish to cancel the appointment if the system data provides an indication that the weather is not suitable for such an activity. The system data may provide further contextual information that may, or may not, relate to the immediate surroundings of the data processing apparatus at that time. The system data may provide contextual information that cannot be provided by sensors fitted locally to the data processing apparatus.

In one or more embodiments, data bits in the data structure that is pointed to by pointer 814 are associated with predetermined characteristics, such that a first data bit is representative of weather, the second data bit is representative of Bluetooth, etc. In other embodiments, a data bit value may be associated with an identifier of what the data bit represents.

In one or more embodiments, the system data pointer 814 may not be present in the signals generated by the sensors, but may be concatenated to the final values for the context aspects of activity, availability, and location that are generated by the context engine and subsequently made available to the application programs, or stored in memory such that the system data pointer 814 can be concatenated with the final values for activity, availability, and location when they are retrieved by an application program.

In other embodiments the data signal 800 may comprise the data structure itself instead of a pointer 814 to the data structure in memory.

Figure 9:
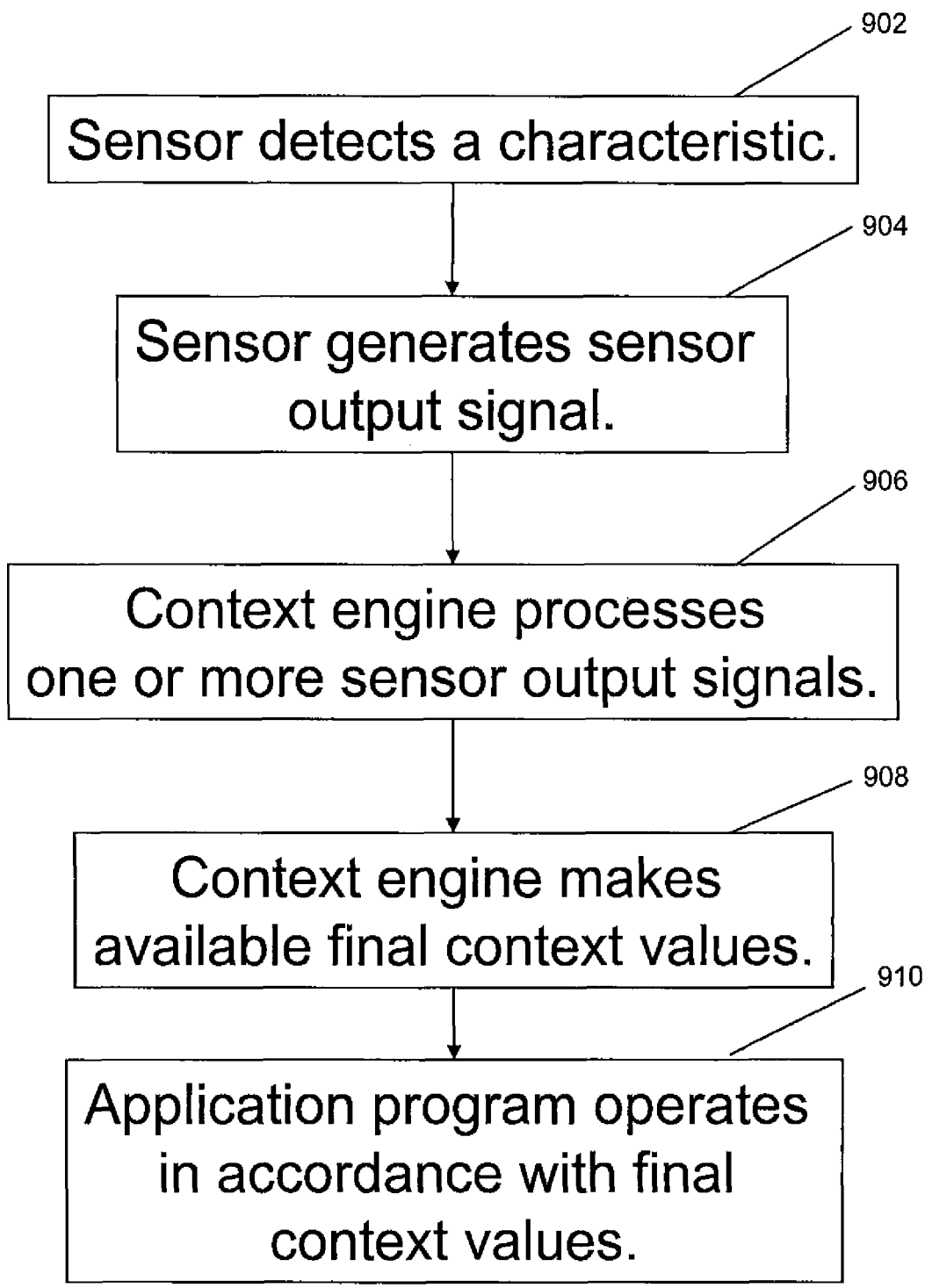
FIG. 9 shows schematically a process flow control diagram according to one embodiment.

FIG. 9 illustrates a process flow control diagram for operating a data processing apparatus, according to one embodiment. At step 902, a sensor detects one or more characteristics that may be a characteristic of the physical environment, or a characteristic of the processing environment of the data processing apparatus, or any other characteristic described herein.

At step 904, the sensor processes the detected characteristic(s) and generates a sensor output signal. The sensor output signal represents one or more contextual aspects of the use of the data processing apparatus such as activity, availability and location.

A context engine processes the sensor output signals generated by one or more sensors at step 906 so as to generate and make available final context values at step 908. The context engine may be a software module stored in memory of the data processing apparatus. The context engine may also process any confidence factors that are present in the sensor output signals so as to make efficient use of the context aspects present in the sensor output signals when generating the final context values. The final context values may represent one or more of a finite list of context value variables stored in memory.

At step 910, an application program operates in accordance with the final context values such that the operation of the application program is more appropriate for/tailored to the context of how the data processing apparatus is being used.

In one or more embodiments, the context engine may be provided with artificial intelligence (AI) for generating the final values for the context attributes (such as activity, availability and location). One or more of the sensors/plug-ins may be provided with AI such that they can process a feedback signal received from the context engine and "learn" how to better assign a value for the context attributes and/or adjust the confidence factor that is associated with one or more of the context aspects generated by that sensor/plug-in. AI may be provided in either, or both, of the context engine and one or more of the sensors.

One or more of the plug-ins/sensors may operate independently as agents and can operate with custom back-propagation, neural-network or expert system approaches which may "learn" and "adapt over time" to the user activity. This can enhance future predictions and correct errors in the predicted values/best guesses. The training of these agents can be reinforced (such as by improving associated confidence factors) by inputting the aggregate/final output values of the context engine core back into the plug-in. Plug-in types can be one or more of simple trigger, statistical analysis of databases such as call log, email history, rule based, and fuzzy logic including artificial intelligence.

Figure 10:
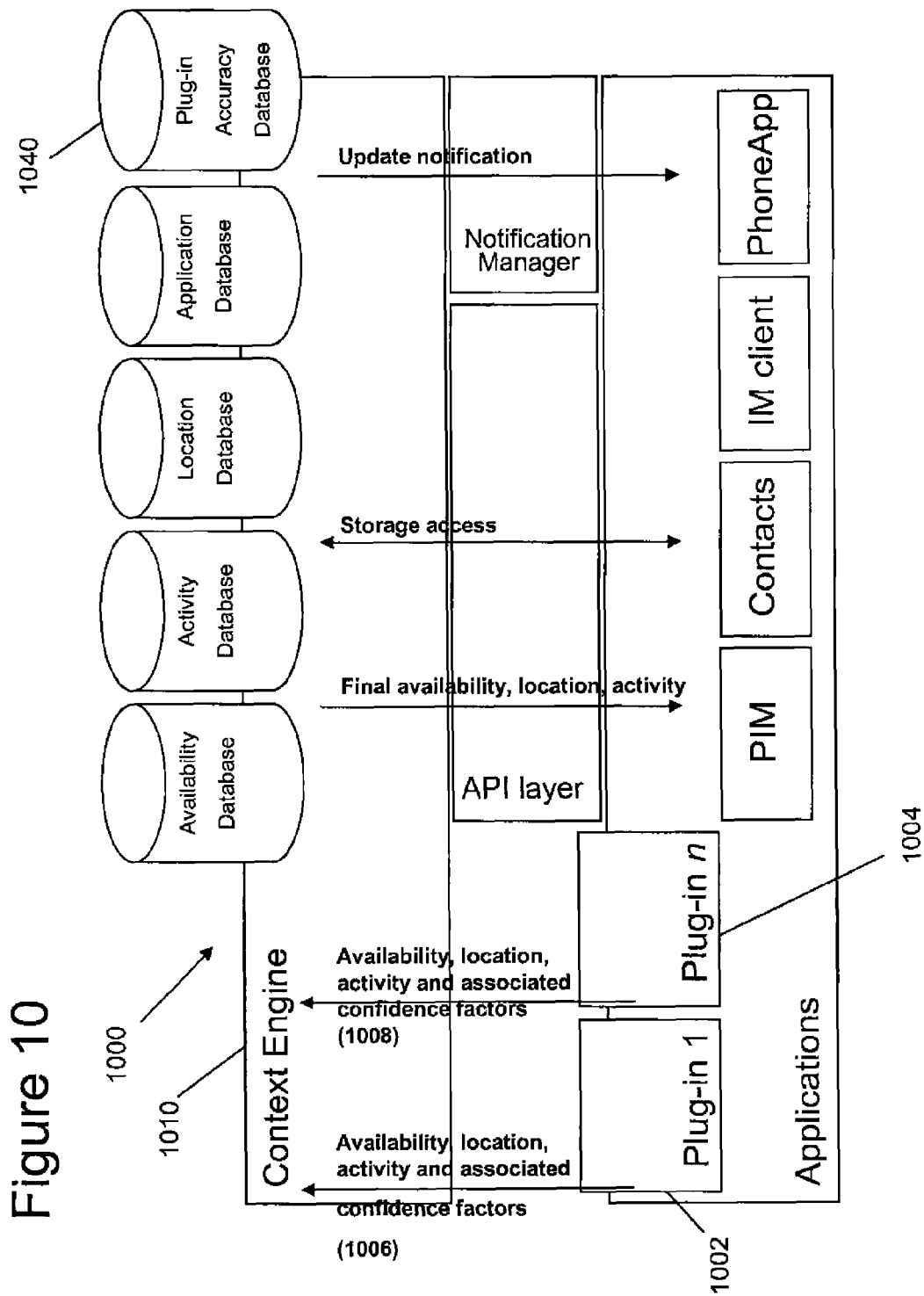
FIG. 10 illustrates a data processing apparatus according to another embodiment.

FIG. 10 shows a data processing apparatus 1000 that is similar to the data processing apparatus 300 shown in FIG. 3, and is further provided with a plug-in accuracy database 1040, according to one embodiment. The plug-in accuracy database 1040 provides a list of all of the plug-ins that provide context information to the context engine with an associated accuracy score that identifies a degree of faith/accuracy that should be placed on data received from that plug-in.

In this embodiment, the plug-in accuracy database 1040 stores an accuracy score for a plug-in 1002, 1004 as a whole, and in other embodiments may store an accuracy score for each individual context aspect/attribute (activity, availability, location).

The context engine 1010 is configured to use the accuracy scores stored in the plug-in accuracy database 1040 when processing the plug-in output signals 1006, 1008 to generate the final context aspect values. In this embodiment, the context engine 1010 multiplies the confidence factor received from a plug-in 1002, 1004 for a context value by the accuracy score for that plug-in as stored in plug-in accuracy database 1040 to determine an aggregate score for the value returned from the plug-in. The context engine 1010 then selects the value with the highest aggregate score as the final value.

As an example, the first plug-in 1002 returns a value for availability of "available" with a confidence value of 70% and the second plug-in 1004 returns a value for availability of "unavailable" with a confidence value of 40%. The first plug-in 1002 has an accuracy score of 50% stored in plug-in accuracy database 1040, and the second plug-in 1004 has an accuracy score of 100% stored in plug-in accuracy database 1040. The context engine 1010 generates an aggregate score for the values returned by each plug-in of 35% (70%×50%) for "available" as returned from the first plug-in 1002, and 50% (50%×100%) for "unavailable" as returned from the second plug-in 1004.

In this example, the context engine 1010 records a final value for the context aspect of availability as "unavailable" as the aggregate score for the value returned from the second plug-in 1004 is higher than the aggregate score for the value returned from the first plug-in 1002.

In one or more embodiments, the context engine 1010 may also record the determined aggregate score with the final value, such that it can be used by an application program that utilizes context information.

In one or more embodiments, the final value determined by the context engine 1010 may be fed back to one or more of the plug-ins 1002, 1004. In other embodiments, the final value/s determined by the context engine 1010 may be read by a plug-in 1002, 1004 from a known location in computer memory. The plug-ins 1002, 1004 may be configured to compare the final value determined by the context engine 1010 with the local value determined by the plug-in 1002, 1004 and adjust the value of the confidence factor for that context aspect accordingly. For example, if the final value and local value are different, the plug-in 1002, 1004 may be configured to reduce the confidence factor associated with that context aspect by 10%. This can provide that the values for a context aspect that is generated by a sensor that is consistently incorrect over time may have a reduced effect when determining what the final value should be, and ultimately may have no effect at all if the confidence factor is reduced to 0%. Also, if the final value and local value are the same, the confidence factor associated with that context aspect may be increased. The confidence factor associated with that context aspect may be increased up to a maximum for that plug-in 1002, 1004 which may be 100% or less than 100%. The maximum confidence factor for a sensor may be set at less than 100% in order to retain a hierarchy of the plug-ins 1002, 1004 such that a first plug-in 1002 will always take precedence over a second plug-in 1004 if they are consistently generating the same local values that correspond to the final value.

In addition, the context engine 1010 may process the local values that a plug-in 1002, 1004 has been returning and determine whether those values are consistent with data returned from other plug-ins 1002, 1004 and/or are consistent with the final values for the context aspects determined by the context engine 1010. The context engine 1010 may adjust the accuracy score associated with a plug-in 1002, 1004 stored in database 1040 if it is determined that there is an inconsistency.

Similarly, an accuracy score for a plug-in may be increased if the data returned from that plug-in is considered correct/consistent.

Adjusting the accuracy score in the plug-in accuracy database 1040 may be used to adjust the weighting given to a plug-in 1002, 1004 as a whole, whereas adjusting the confidence factor associated with a context aspect at the plug-in 1002, 1004 can enable the weighting given to individual context aspect values generated by a plug-in 1002, 1104 to be adjusted.

In one or more embodiments, the list of potential values for the attributes (such as those stored in availability database 312, activity database 314, and location database 316 in FIG. 3) may be automatically generated by the context engine, and values may be adapted, added to, and removed from the list of potential values over time using the artificial intelligence processing. The list of potential values may be entirely automatically generated or may be adapted from pre-existing either user-defined or generic values. The plug-ins and/or the context engine may be capable of learning how to assign context attribute values autonomously (without user intervention) such as through use of a calendar application program, and all the user needs to do to train the data processing apparatus is to use it.

If a plug-in cannot reliably predict a user's behavior, it may reduce its confidence factor and/or the context engine may reduce its associated accuracy score, and ultimately the confidence factor may be set to 0 such that data generated by that plug-in is not utilized for generating context values at all.

In one or more embodiments, the data processing apparatus may be capable of learning locations/activities/availabilities by correlating with entries in the user's calendar and/or to-do list application programs for example. In this way the data processing apparatus can become uniquely tailored to the user and not to the data processing apparatus device as such. This can provide a transparent and unobtrusive device that is user-friendly as it adapts itself to the user, as opposed to the user adapting to how the device is set up. The data processing apparatus can utilize contextual concepts such as "here", "there", "done", "busy" which can improve a user's experience of using the data processing apparatus.

In one or more embodiments, the confidence factor associated with an attribute value as determined by a sensor may be degraded over time. In one or more embodiments, a sensor on a mobile telephone determines that the longer a value stays the same the less likely it is to be correct. For example, if a ringer switch is in the silent position and the sensor determines that the activity of the user is "in a meeting," the sensor may reduce the confidence in the value after the scheduled finishing time of the meeting and/or if the location of the data processing apparatus changes as this may be indicative of the user forgetting to take their mobile telephone off silent mode.

After a threshold time, the confidence in the validity of a context aspect value generated by a plug-in may decrease, and the confidence factor corresponding to that value may be decreased accordingly. The confidence factor may decrease linearly or according to a predetermined function. In embodiments where the context engine is configured to provide the plug-in with feedback, the threshold time and/or the time from which the threshold time is calculated may be adjusted. For example, the threshold time may run from the last time that a final value for the context aspect was calculated. If the final value is recalculated after expiry of the threshold time the confidence factor may be reset to its maximum value or may be fixed as it us until the threshold time expires again, or until a different value is calculated either by the plug-in or by the context engine.

In one or more embodiments, user inputs is used by the context engine to further refine the confidence factors generated by the plug-ins and/or the context engine to assist in the artificial intelligence learning processes. The user inputs may also be used by the context engine when amending, adding or removing values from the list of potential values.

In one or more embodiments, multiple sensors may be associated with the same plug-in application such as the ringer switch, telephony application, etc. For example, multiple sensors may be provided that are configured to process the same detected characteristics in different ways to generate potentially different local values for the context aspects. Feedback from the context engine may be used to adjust the local confidence values such that sensors that generate the correct value may have their confidence values reinforced and sensors that generate an incorrect value have their confidence factors reduced until only those sensors that generate correct values remain with non-zero confidence factors.

Embodiments described herein may provide a system that provides a single unified representation of a user's contextually-sensitive activity which can be automatically used by an application program to allow the construction of new and improved user interfaces and user interaction for the application programs. All system applications may provide inputs into a context framework to maintain the context data and facilitate the broadcast and query of the context data.

A user's context may have a number of fundamental atomic components. In one embodiment the user's context are availability, activity and area/location. These atomic elements can be combined in a number of ways to represent user state such as busy, on the phone, in the car. The context may be a combination of system state and user state, optionally with a further primitive of "data", such as system data. A user's context may be composed of values for availability, activity, area, and data. Embodiments described herein may enable arbitrary user activity to be automatically translated into machine-usable data.

In one embodiment, the context engine core, and its associated processing, may be restricted to local operations performed internally by the data processing apparatus. That is, the data processing apparatus continues to interface with external devices using existing application programs in the same way as before (i.e. without the context engine) and only uses the context information to improve the usability of the data processing apparatus to a local user. In other embodiments, context information can be shared between different data processing apparatus and/or different users.

The various embodiments disclosed herein may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of embodiments of the present disclosure. This was done merely for convenience and to give a general sense of the embodiments of the present disclosure. This description should be read to include one or at least one and the singular also includes the plural unless it is obvious that it is meant otherwise.

The macroblock based scaling reduces the memory bandwidths required to perform scaling. Therefore, the overall process of transcoding may become faster and more efficient. Furthermore, scaling of transcoder parameters at the scaler eliminates the need to perform such processes as motion estimation at the encoder, which enhances the efficiency of the transcoding processes. Further, other image processing processes such as color conversion may be performed during the scaling process.

Embodiments described herein may characterize sensor input data into one or more context aspects, and provide a value and confidence factor for those context aspects to a context engine that is configured to generate final values for the context aspects and make available the context aspect final values for utilization by one or more application programs.

Upon reading this disclosure, those of skill in the art will appreciate still additional alternative structural and functional designs for controlling the operation of an application program in accordance with the context of an associated data processing apparatus through the disclosed principles herein. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method and apparatus of the disclosed aspects herein without departing from the spirit and scope as defined in the appended claims.

What is claimed is:

1. A data processing apparatus comprising:
a plurality of mechanisms that are operable to determine a user's availability, activity and location, including two or more mechanisms of different types each generate an output corresponding to each type of mechanism; and
a processor to (i) receive the outputs from the two or more mechanisms, (ii) automatically use the outputs of the two or more mechanisms to determine a state of use of the data processing apparatus, and (iii) based on the state of use, cause at least one or more hardware components of the data processing apparatus to be disabled;
wherein the state of use of the data processing apparatus is determined, at least in part, by (i) one or more availability values that includes at least one of a first value indication that the user is available, a second value indicating that the user is not to be disturbed, or a third value indicating that the user is offline, (ii) one or more activity values that includes at least one of a fourth value indicating that the user is driving, a fifth value indicating that the user is typing, a sixth value indicating that the user is in a meeting, or a seventh value indicating that user is away on a holiday, and (iii) one or more location values that includes at least one of an eighth value indicating that the user is at home, a ninth value indicting that the user is at work, a tenth value indicating that the user is in a gym, or an eleventh value indicating that the user is in a car.

2. The data processing apparatus of claim 1, wherein the plurality of mechanisms includes at least one of a microphone, a keyboard, a digitizer, an application, an activity log, a wireless network radio, a cellular radio, a Global Positioning System (GPS) unit or accessories connected to the data processing apparatus.

3. The data processing apparatus of claim 1, wherein the processor is configured to operate an application program, the application program comprising at least one of a personal information manager (PIM) application, a calendar application, a contacts application, an instant messaging (IM) application, or a mobile telephony application.

4. The data processing apparatus of claim 1, wherein the one or more hardware components includes at least one radio communication ports.

5. The data processing apparatus of claim 1, wherein the data processing apparatus comprises a mobile computing device.

6. The data processing apparatus of claim 1, wherein the processor is further configured to conserve a battery level of the data processing apparatus based on the state of use.

7. The data processing apparatus of claim 1, further comprising an input mechanism, and wherein the processor is further configured to determine the state of use of the data processing apparatus in response to user input via the input mechanism.

8. The data processing apparatus of claim 1, wherein the data processing apparatus comprises a memory resource for storing a database that stores a list of the plurality of mechanisms that generate an output.

9. A method of operating a computing device, comprising:
determining a user's availability, activity and location using a plurality of mechanisms of the computing device, the plurality of mechanisms including two or more mechanisms of different types that each generate an output corresponding to each type of mechanism;
receiving the outputs from the two or more mechanisms;
automatically using the outputs of the two or more mechanisms to determine a state of use of the computing device, wherein the state of use of the computing device is determined, at least in part, by (i) one or more availability values that includes at least one of a first value indicating that the user is available, a second value indicating that the user is not to be disturbed, or a third value indicating that the user is offline, (ii) one or more activity values that includes at least one of a fourth value indicating that the user is driving, a fifth value indicating that the user is typing, a sixth value indicating that the user is in a meeting, or a seventh value indicating that user is away on a holiday, and (iii) one or more location values that includes at least one of an eighth value indicating that the user is at home, a ninth value indicting that the user is at work, a tenth value indicating that the user is in a gym, or an eleventh value indicating that the user is in a car; and
based on the state of use, causing at least one or more hardware components of the computing device to be disabled.

10. The method claim 9, wherein the plurality of mechanisms includes at least one of a microphone, a keyboard, a digitizer, an application, an activity log, a wireless network radio, a cellular radio, a Global Positioning System (GPS) unit or accessories connected to the computing device.

11. The method of claim 9, wherein the one or more hardware components includes at least one radio communication ports.

12. The method of claim 9, wherein automatically using the outputs of the two or more mechanisms to determine a state of use of the computing device includes determining the state based, at least in part, a user input via an input mechanism of the computing device.

13. A data processing apparatus comprising:
a sensor configured to (i) select at least one sensor value indicating a user's availability, activity and location based on at least one of statistical data, event data and environmental data of the sensor, (ii) determine a confidence factor associated with each sensor value, and (iii) generate a sensor output signal representative of the at least one selected sensor value and the confidence factor associated with the at least one selected sensor value, wherein the statistical data represents usage data, the event data represents a current use information and the environmental data represents an estimate of the apparatus' surroundings;
a context engine module configured to (i) receive the sensor output signal from the sensor, and (ii) compute context values based on the output signal, the context values indicating the user's availability, activity and location; and
an application executing on the data processing apparatus configured to utilize the context values to perform an operation based on the user's availability, activity and location;
wherein the context values includes(i)one or more availability values that includes at least one of a first value indicating that the user is available, a second value indicating that the user is not to be disturbed, or a third value indicating that the user is offline; (ii) one or more activity values that includes at least one of a fourth value indicating that the user is driving, a fifth value indicating that the user is typing, a sixth value indicating that the user is in a meeting, or a seventh value indicating that user is away on a holiday; and (iii) one or more location values that includes at least one of an eighth value indicating that the user is at home, a ninth value indicating that the user is at work, a tenth value indicating that the user is in a gym, or an eleventh value indicating that the user is in a car.

* * * * *

UNITED STATES PATENT AND TRADEMARK OFFICE
CERTIFICATE OF CORRECTION

PATENT NO. : 8,587,402 B2
APPLICATION NO. : 12/044905
DATED : November 19, 2013
INVENTOR(S) : O'Shaughnessy et al.

Page 1 of 2

It is certified that error appears in the above-identified patent and that said Letters Patent is hereby corrected as shown below:

On the Title Page

On page 2, under (56) References Cited (column 2); delete the word "Searach" and insert -- Search --, therefore.

In the Specification

In column 1, line 38, delete the word "user in" and insert -- user being in --, therefore.

In column 10, line 8, delete "therefore has" and insert -- therefore has a --, therefore.

In column 10, lines 9-10, delete "factors" and insert -- factor --, therefore.

In column 11, line 31, delete "smpt" and insert -- smtp --, therefore.

In column 11, line 46, delete "callog" and insert -- call log --, therefore.

In column 11, line 60, delete "wireless networking" and insert -- wireless network --, therefore.

In column 16, line 57, delete "plug –in" and insert -- plug-in --, therefore.

In column 19, line 43, delete "identify" and insert -- identity --, therefore.

In the Claims

In columns 20-21, lines 67-1, in Claim 1, delete "indication" and insert -- indicating --, therefore.

Signed and Sealed this
Second Day of December, 2014

Michelle K. Lee
*Deputy Director of the United States Patent and Trademark Office*

CERTIFICATE OF CORRECTION (continued)
U.S. Pat. No. 8,587,402 B2

In column 21, line 10, in Claim 1, delete "indicting" and insert -- indicating --, therefore.

In column 22, line 4, in Claim 9, delete "indicting" and insert -- indicating --, therefore.

In column 22, line 10, in Claim 10, delete "method" and insert -- method of --, therefore.

In column 22, line 46, in Claim 13, delete "includes(i)one" and insert -- includes (i) one --, therefore.